(12) United States Patent
Uchida

(10) Patent No.: US 6,812,528 B2
(45) Date of Patent: Nov. 2, 2004

(54) SURGE PROTECTION CIRCUIT FOR SEMICONDUCTOR DEVICES

(75) Inventor: Hiroyuki Uchida, Kagoshima (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 09/874,296

(22) Filed: Jun. 6, 2001

(65) Prior Publication Data

US 2001/0050835 A1 Dec. 13, 2001

(30) Foreign Application Priority Data

Jun. 7, 2000 (JP) ......................................... 2000-170057

(51) Int. Cl.⁷ ............................................. H01L 23/62
(52) U.S. Cl. ....................... 257/355; 257/347; 257/356
(58) Field of Search ............................... 257/347, 355, 257/356, 357

(56) References Cited

U.S. PATENT DOCUMENTS 5,272,586 A * 12/1993 Yen ............................ 361/111

FOREIGN PATENT DOCUMENTS

| JP | 5-303115 | 11/1993 |
|---|---|---|
| JP | 6-18924 | 1/1994 |
| JP | 9-80469 | 3/1997 |
| JP | 11-119256 | 4/1999 |

* cited by examiner

*Primary Examiner*—Sara Crane
(74) *Attorney, Agent, or Firm*—McGinn & Gibb, PLLC

(57) ABSTRACT

A surge protection device includes a gate electrode embedded in an insulator, a source electrode and a drain electrode on the insulator. The source and drain electrodes respectively form first and second capacitances with the gate electrode. A semiconductor island is provided on the insulator to form a channel between the source and drain electrodes and a third capacitance with the gate electrode. The third capacitance is smaller than either of the first and second capacitances. The source and drain electrodes are adapted for connection to external circuitry for establishing a low-impedance path when the external circuitry is subjected to a surge potential.

23 Claims, 6 Drawing Sheets

US 6,812,528 B2

SURGE PROTECTION CIRCUIT FOR SEMICONDUCTOR DEVICES

BACKGROUND OF THE INVENTION

1. Field of the Invention

The present invention relates to a surge protection circuit for semiconductor devices, particularly suitable for use in active matrix liquid crystal displays.

2. Description of the Related Art

Japanese Patent Publication 11-119256 discloses a surge protection circuit for a TFT (thin-film transistor) array of liquid crystal display elements connected to intersections of vertical and horizontal signal lines. The drains of all switching transistors are respectively connected to the vertical signal lines and the gates of all switching transistors are respectively connected to the horizontal signal lines. The prior art surge protection circuit is composed of a first array of bi-directional nonlinear circuits associated with the vertical lines and a second array of bi-directional nonlinear circuits associated with the horizontal lines. Each protection circuit is formed by a pair of first and second thin-film transistors. In each protection circuit, the drain and gate of the first transistor are connected together to a reference voltage terminal to which the source of the second transistor is also connected, and the drain and gate of the second transistor are connected together to the associated signal line to which the source of the first transistor is also connected. The vertical and horizontal signal lines are terminated at corresponding pad terminals. When high-voltage static energy builds up on a pad terminal of the LCD array, one of the associated transistors is turned to provide a low-impedance path for the static energy.

During manufacture of a protection transistor, an interlayer contact is established between the drain and the gate region by forming a contact hole (throughhole) in the gate insulator using a mask so that part of the gate region is exposed and depositing metal in the contact hole when the drain region is completed. Alternatively, after a gate and a drain region are formed, a contact hole is provided therebetween. Then, the gate and drain regions are connected through the contact hole when a transparent conductive film is deposited simultaneously with the deposition of the transparent conductive film for pixel electrodes.

Study has recently been undertaken to cut down the manufacturing cost of thin film transistor arrays by reducing masking processes. Since a masking process is used for establishing an interlayer contact between drain and gate electrodes, this cost reduction approach cannot be applied to the prior art surge protection circuit.

According to Japanese Patent Publication 6-18924, surge voltage is discharged through a path established between drain electrodes of adjacent signal lines, rather than through the gate-drain interlayer contact. This is achieved by separating signal lines at intervals of a few micrometers so that capacitive coupling is established between associated pad electrodes. When a high-voltage static surge develops, a potential difference occurs between adjacent signal lines and the surge is spark-discharged through the capacitive path and all signal lines are driven to the same potential. However, since the generation of a spark is necessary for discharging surge potentials, the protection circuit is not reliable.

SUMMARY OF THE INVENTION

It is therefore an object of the present invention to provide a surge protection transistor that can be fabricated with a reduced number of production steps.

The stated object is obtained by the provision of a floating-gate field effect transistor which is configured to form a low impedance path for a surge potential which builds up in a semiconductor device to be protected.

According to a first aspect of the present invention, there is provided a surge protection device comprising a gate electrode embedded in an insulator, a source electrode and a drain electrode on the insulator, the source and drain electrodes respectively forming first and second capacitances with the gate electrode, and a semiconductor island on the insulator. The semiconductor island forms a channel between the source and drain electrodes and a third capacitance with the gate electrode, the third capacitance being smaller than either of the first and second capacitances, the source and drain electrodes being adapted for connection to external circuitry for establishing a low-impedance path when the external circuitry is subjected to a surge potential.

According to a second aspect, the present invention provides a surge protection circuit comprising a plurality of surge protection devices. Each of the protection devices comprises a gate electrode embedded in an insulator, a source electrode and a drain electrode on the insulator, the source and drain electrodes respectively forming first and second capacitances with the gate electrode. A semiconductor island is formed on the insulator, the island forming a channel region between the source and drain electrodes and a third capacitance with the gate electrode, the third capacitance being smaller than either of the first and second capacitances.

The source and drain electrodes of each of the surge protection devices may be respectively connected to the drain and source electrodes of adjacent ones of the plurality of surge protection devices and further connected to pad electrodes of external circuitry for establishing connections with the adjacent surge protection devices when one of the pad electrodes is subjected to a surge potential. Alternatively, the source and drain electrodes of each of the surge protection devices may be connected in series to external circuitry for establishing a low-impedance path to ground when the external circuitry is subjected to a surge potential.

According to a third aspect, the present invention provides a surge protection circuit for a semiconductor display device. The display device includes a first plurality of pad electrodes, a plurality of vertical signal lines connected respectively to the first plurality of pad electrodes, a second plurality of pad electrodes, and a plurality of horizontal signal lines intersecting the vertical signal lines, the horizontal signal lines being connected respectively to the second plurality of pad electrodes. The surge protection circuit comprises a plurality of floating-gate field effect transistors. Each transistor includes a floating gate electrode, a source electrode and a drain electrode, the source and drain electrodes of each of the transistors being respectively connected to the drain and source electrodes of adjacent ones of the plurality of floating-gate transistors and further connected to the first plurality of pad electrodes for establishing connections with the adjacent floating-gate transistors when one of the first plurality of pad electrodes or one of the plurality of vertical signal lines is subjected to a surge potential. Alternatively, the source and drain electrodes of each of the transistors are respectively connected to the vertical signal lines for establishing a low-impedance path to ground when one of the first plurality of pad electrodes or one of the plurality of vertical signal lines is subjected to a surge potential.

BRIEF DESCRIPTION OF THE DRAWINGS

The present invention will be described in detail further with reference to the following drawings, in which.

DETAILED DESCRIPTION

Figure 1:
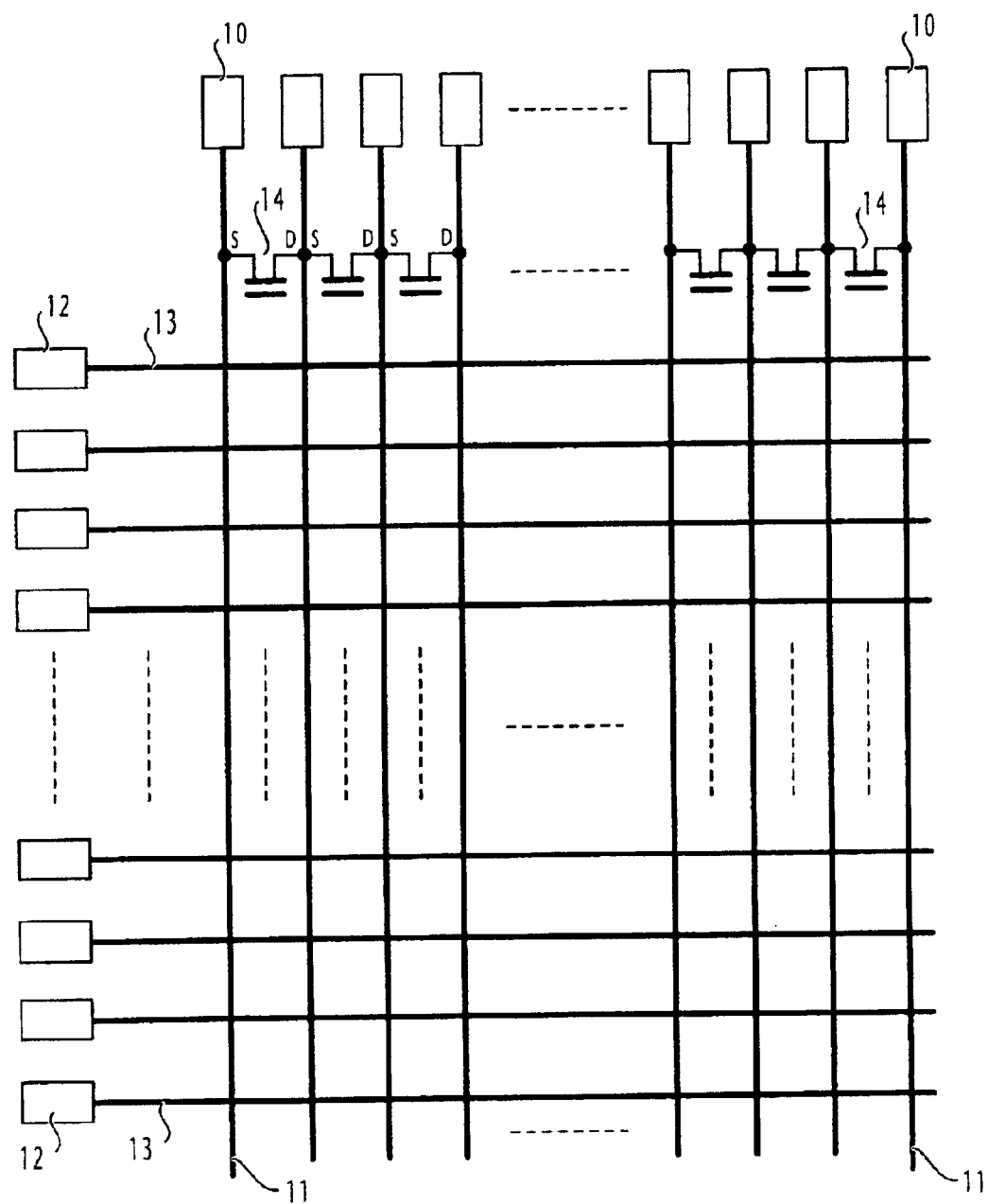
FIG. 1 is a top plan view of a liquid crystal display panel of a first embodiment, incorporating surge protection circuits of the present invention.

In FIG. 1, an active matrix LCD display panel according to a first embodiment of the present invention is illustrated. The display panel comprises a first plurality of pad electrodes 10 respectively connected to vertical signal lines 11 and a second plurality of pad electrodes 12 respectively connected to horizontal signal lines 13. Switching transistors, not shown, are connected to the intersections of the vertical and horizontal signal lines. Surge protection transistors 14 are floating-gate field effect transistors whose source and drain electrodes are connected to adjacent vertical signal lines 11 in such a manner that the drain of one transistor and the source of an adjacent transistor are connected together to the same vertical signal line. Since the drain electrodes of all switching transistors are connected to the vertical signal lines and their gate electrodes are connected to the horizontal signal lines, the vertical signal lines are also called drain bus lines and the horizontal signal lines are also called gate bus lines.

Figure 2:
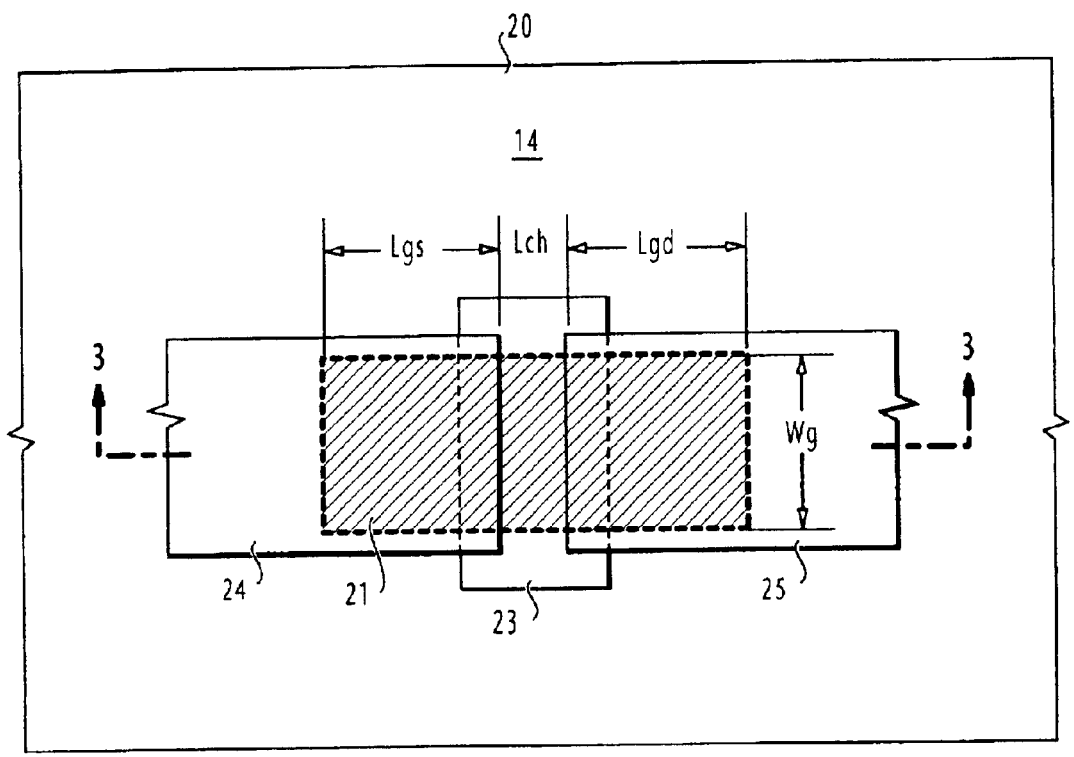
FIG. 2 is a plan view of a surge protection transistor of the present invention.
Figure 3:
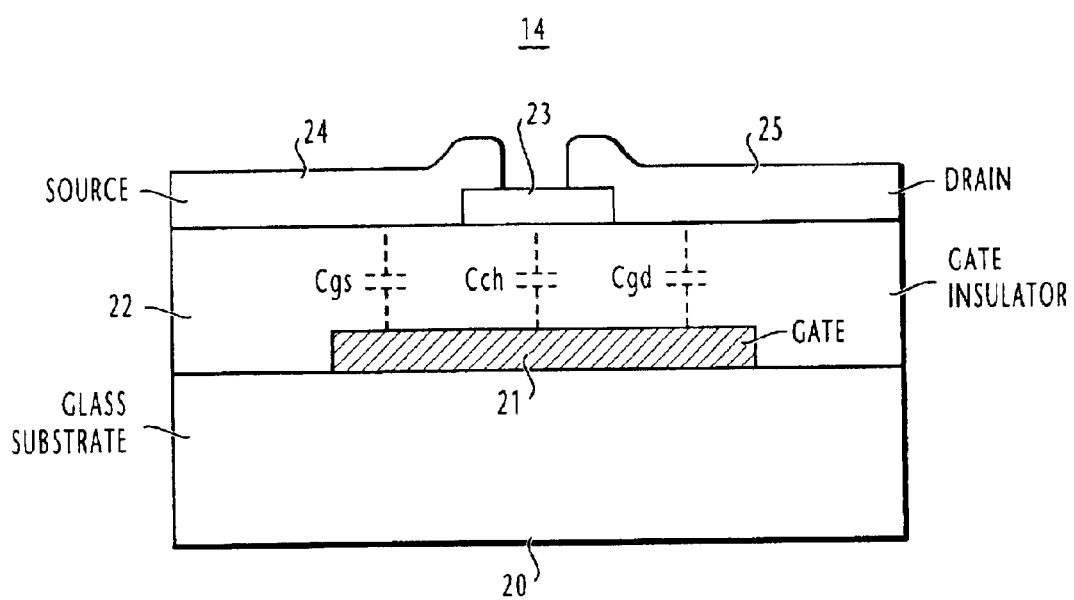
FIG. 3 is a cross-sectional view taken along the lines 3—3 of FIG. 2.

In FIGS. 2 and 3, a representative surge protection transistor 14 is shown fabricated on a common glass substrate 20 on which the gate 21 of the transistor is embedded in a gate insulator 22. On the gate insulator 22 is a semiconductor island 23 of amorphous silicon. The source electrode 24 and the drain electrode 25 of the transistor are formed on the opposite sides of the island 23 so that they are separated by a channel with a length "Lch", which forms a channel capacitance "Cch" with the gate 21. Source 24 and the gate 21 overlap with each other by a length "Lgs" to form a gate-source capacitance "Cgs" and the drain 25 and the gate 21 overlap with each other by a length "Lgd" to form a gate-drain capacitance "Cgd". For a gate width Wg of 24 micrometers, each of the overlapping lengths Lgs and Lgd is equal to 24 micrometers and the channel length Lch is 6 micrometers. Therefore, the capacitances Cgs and Cgd are equal to each other and each of these capacitances is much greater than the channel capacitance Cch.

If a positive pulse charge builds up on the source 24 of a surge protection transistor 14, the source electrode is driven sharply to a positive potential. Since the gate electrode 21 is floated in isolation, the presence of capacitances Cgs and Cgd of equal magnitude, the positive potential at the source electrode 24 raises the gate 21 to some positive level. Because capacitances Cgs and Cgd are much greater than channel capacitance Cch, the gate potential is raised to a point that is intermediate between the source and drain potentials. Under this condition, the gate potential is higher than the potential at the drain 25 and hence, the floating-gate transistor 14 is switched to an ON state. In a similar manner, if the source electrode 24 is negatively charged, the gate electrode 21 is driven to a negative potential that is intermediate between the source and drain potentials. Since the drain electrode 25 is driven close to the ground potential, the floating-gate transistor 14 is turned ON. Because of the symmetrical configuration of the source and drain electrodes with respect to the gate, similar events occur when positive or negative static charge builds up on the drain electrode 25.

More specifically, if capacitances Cgs and Cgd are equal to twice the value of channel capacitance Cch the gate potential is approximately 40 percent of the potential rise of the source or drain electrode. If capacitances Cgs and Cgd are equal to four times the value of channel capacitance Cch the gate potential is approximately 44 percent of the potential rise of the source or drain electrode.

Due to the floating-gate field effect transistor, the need to provide contact holes is eliminated, simplifying the production steps. In addition, the bi-directional nonlinear operating characteristic can be obtained by a single floating-gate field effect transistor 14. This is advantageous for reducing the amount of space to be required for protection circuitry and allowing the protection circuit to be used for a high resolution display device in which the interval between successive vertical signal lines (or drain bus lines) is significantly small.

When one of the vertical signal lines 11 is charged with a surge potential, the corresponding pair of floating-gate transistors 14 are switched ON. As a result, the energy at the original point divides into two charge packets, which propagate along the array of transistors 14 in opposite directions, successively switching them into ON state with decreasing potentials to allow the charge packets to escape through the associated pad electrodes 10.

The floating-gate field effect transistors of the present invention can be arranged in a number of different ways as illustrated in FIGS. 4, 5, 6 and 7.

Figure 4:
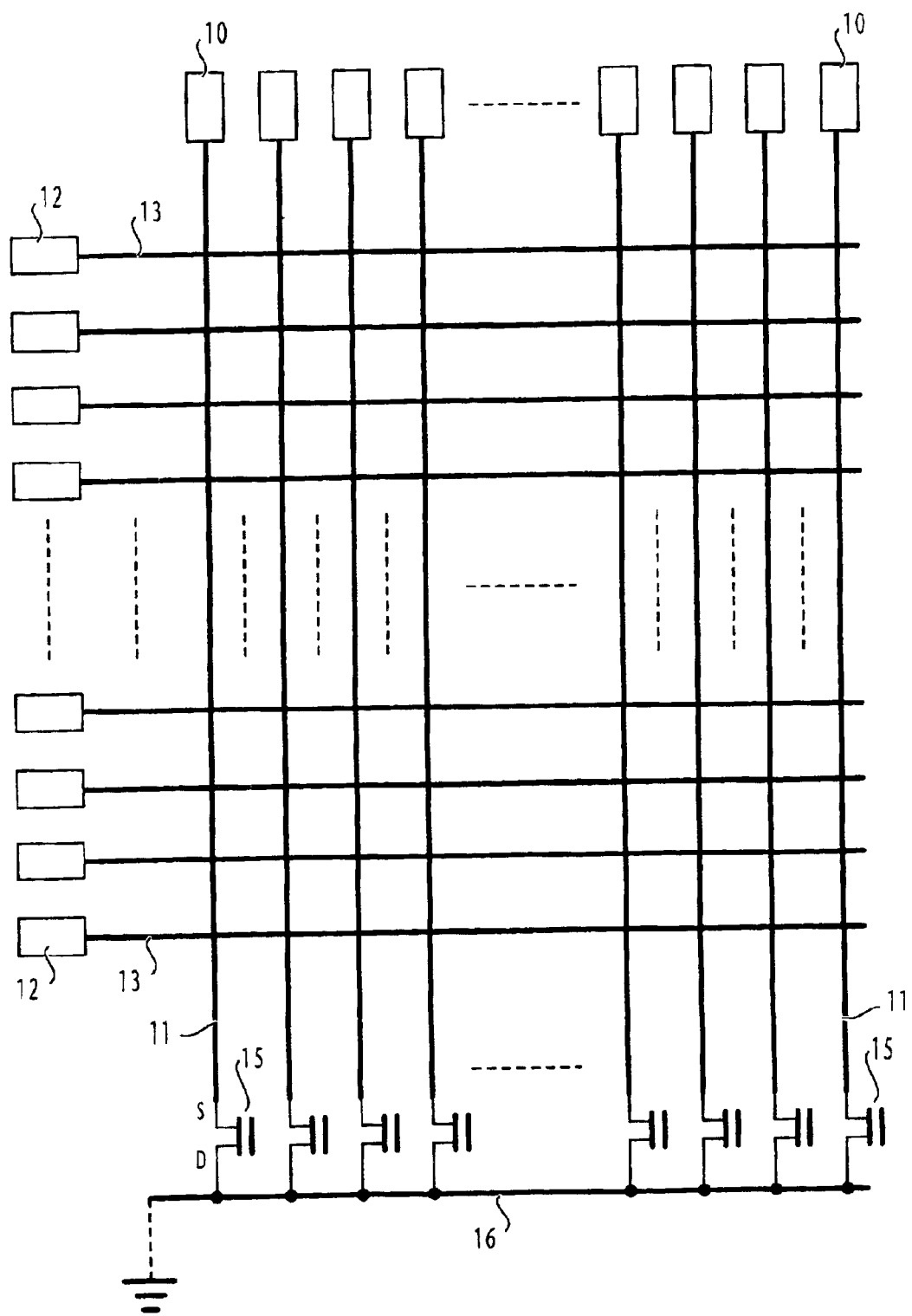
FIGS. 4 to 7 are circuit diagrams of modified arrangements of the floating-gate field effect transistors of the present invention.
Figure 5:
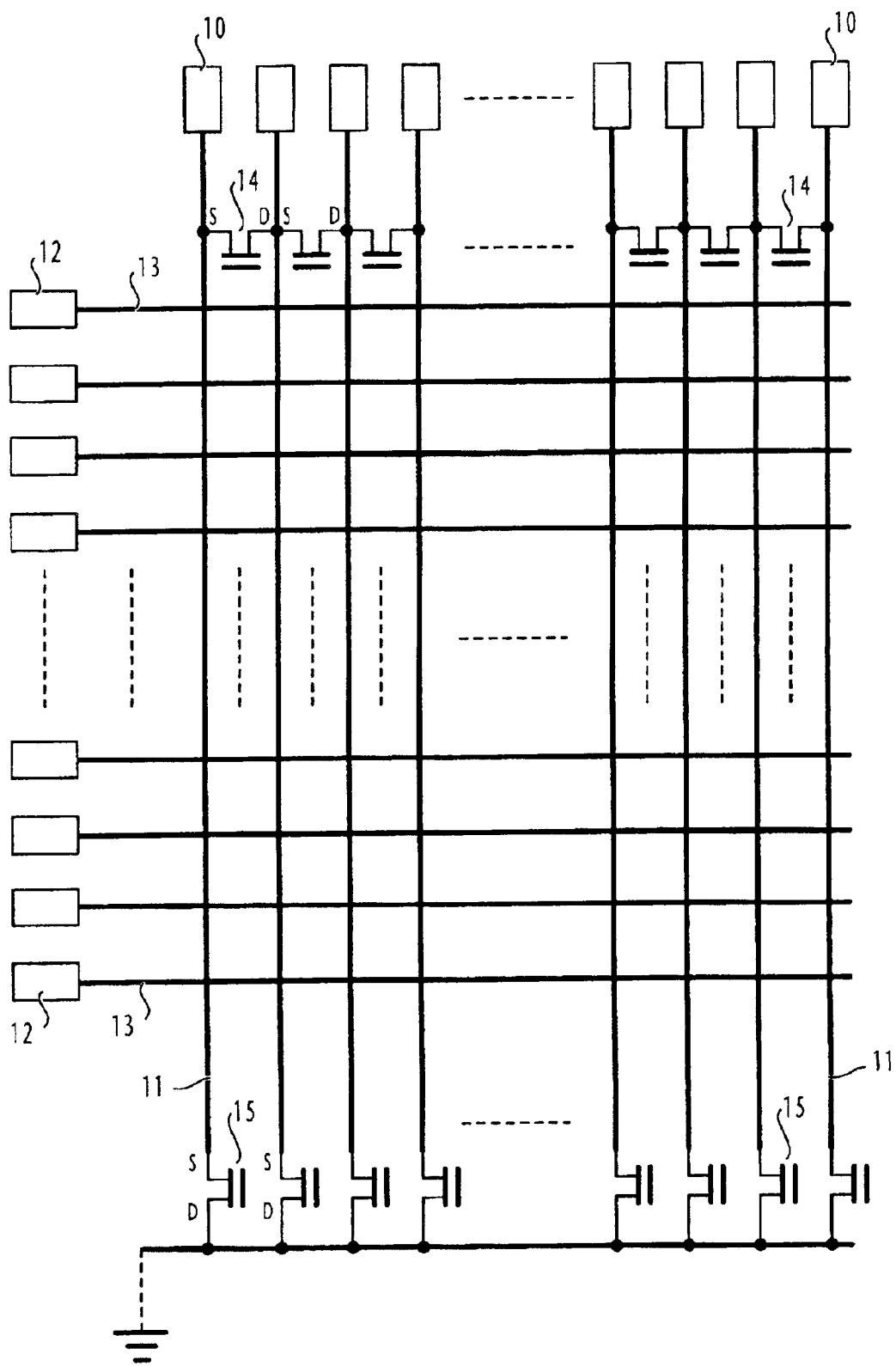

In FIG. 4, the vertical signal lines 11 of the display panel are respectively connected to the source electrodes of floating-gate field-effect transistors 15 of the present invention and their drain electrodes are connected to a common shunt line 16, which is connected to the ground. When a surge potential builds up on one of the vertical signal lines, the corresponding surge protection transistor 15 is turned ON, allowing the charge to escape to the ground. In addition to the transistors 15, the transistor array of FIG. 1 may be provided as shown in FIG. 5. Static energy can be distributed along the transistors 14 and discharged individually to the ground by the transistors 15. The distributed discharging effect of the array of transistors 14 is effectively combined with the individual ground discharging effect of transistors 15 to protect the display from significantly high surge potentials.

Figure 6:
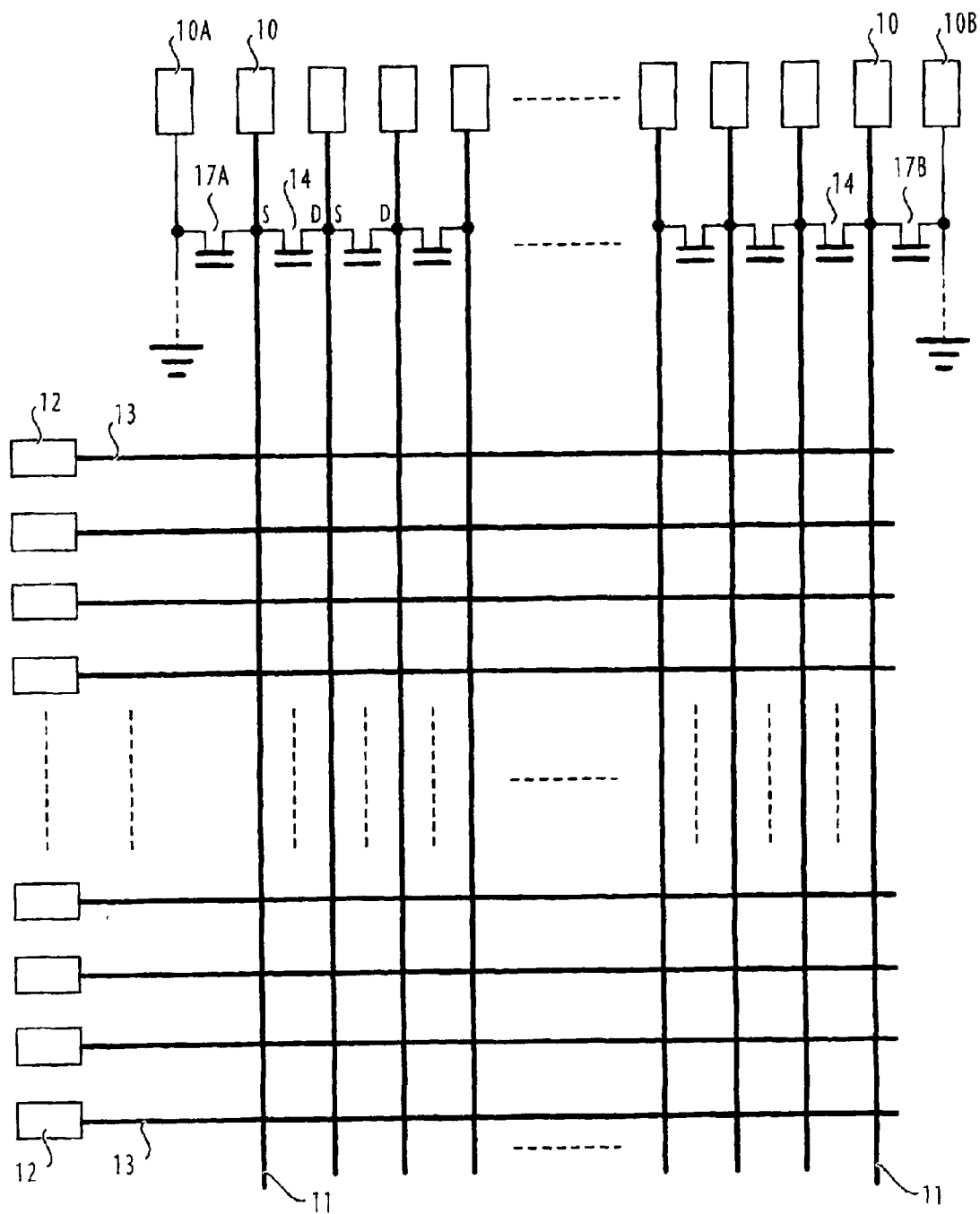
Figure 7:
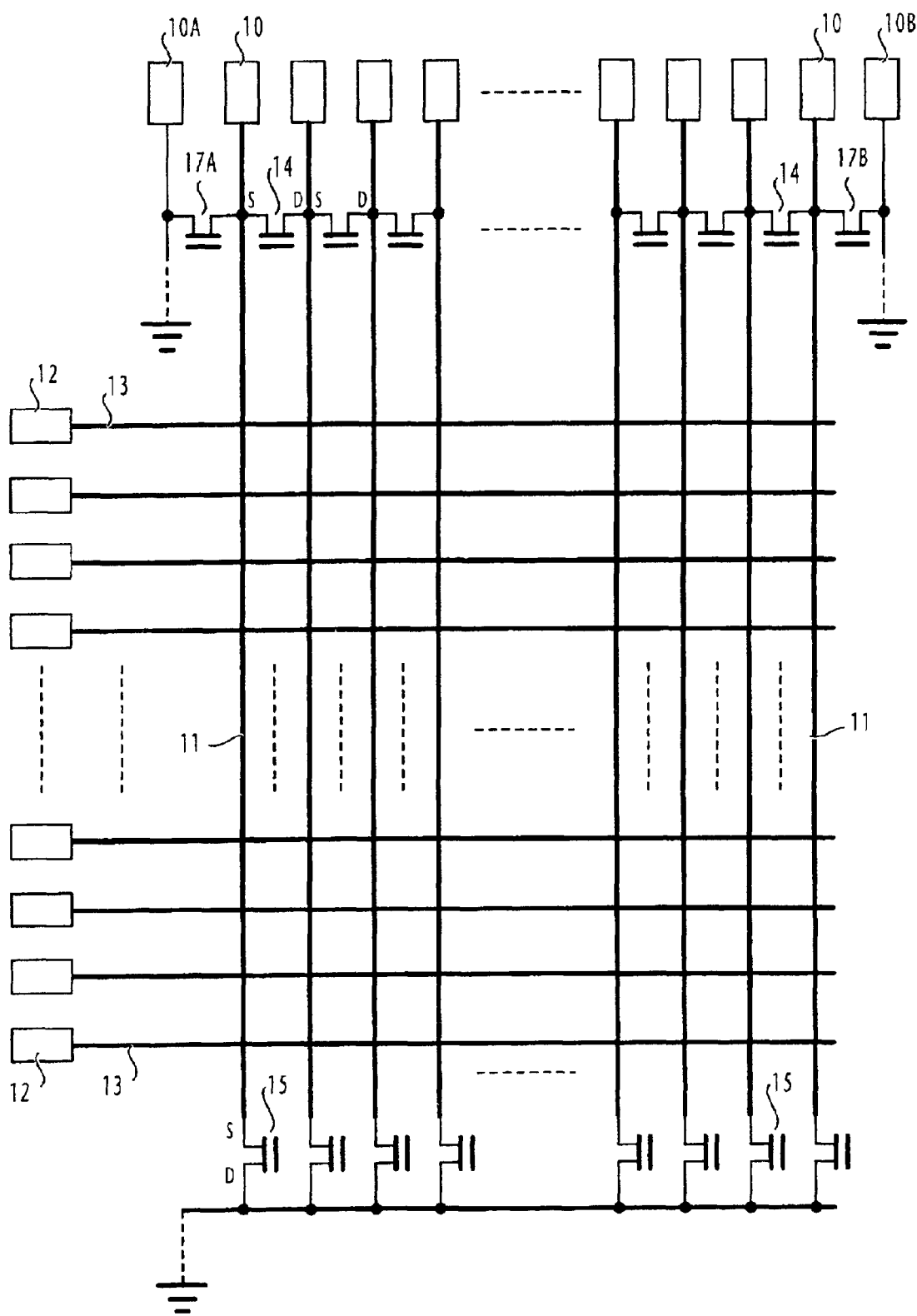

FIG. 6 shows a modified arrangement of the protection circuit of FIG. 1. In this modification, floating-gate field effect transistors 17A and 17B are additionally connected to the opposite ends of the array of transistors 14. Specifically, the source-drain path of transistor 17A is connected between a transfer pad electrode 10A and the left-most transistor of the array, and the source-drain path of transistor 17B is connected between the right-most transistor of the array and a transfer pad electrode 10B. Transfer pad electrodes 10A and 10B are connected to ground. Transistors 17A and 17B provide extra ground-discharge paths to protect the display device from high potential charges. For significantly high potential surges, the arrangement of FIG. 7 is suitable in which the transistor array of FIG. 6 is combined with the array of FIG. 4.

What is claimed is:

1. A surge protection device, comprising:
an insulator;
a gate electrode embedded in said insulator;
a source electrode and a drain electrode on said insulator, said source and drain electrodes respectively forming first and second capacitances with said gate electrode; and a semiconductor island on said insulator, said island forming a channel region between said source and drain electrodes and forming a third capacitance with said gate electrode, said third capacitance being smaller than either of said first and second capacitances, said source and drain electrodes being adapted for connection to external circuitry for establishing a low-impedance path when the external circuitry is subjected to a surge potential.

2. The surge protection device of claim 1, wherein said first and second capacitances are of equal value.

3. A surge protection circuit, comprising:
a plurality of surge protection devices, each of said protection devices comprising:
an insulator;
a gate electrode embedded in said insulator;
a source electrode and a drain electrode on said insulator, said source and drain electrodes respectively forming first and second capacitances with said gate electrode; and
a semiconductor island on said insulator, said island forming a channel region between said source and drain electrodes and forming a third capacitance with said gate electrode, said third capacitance being smaller than either of said first and second capacitances, said source and drain electrodes of each of said surge protection devices being respectively connected to the drain and source electrodes of adjacent ones of said plurality of surge protection devices and adapted to be connected to pad electrodes of external circuitry for establishing connections with said adjacent surge protection devices when one of the pad electrodes is subjected to a surge potential.

4. The surge protection circuit of claim 3, wherein said first and second capacitances of each of said surge protection devices are of equal value.

5. The surge protection circuit of claim 3, further comprising:
a second plurality of surge protection devices identical in structure to said plurality of surge protection devices, the source-drain paths of said second plurality of surge protection devices being respectively connected to the pad electrodes via respective lines for establishing a low-impedance path to ground.

6. The surge protection circuit of claim 3, further comprising:
a first additional surge protection device identical in structure to said plurality of surge protection devices and connected between a first one of said plurality of surge protection devices and ground; and
a second additional surge protection device identical in structure to said plurality of surge protection devices and connected between a second one of said plurality of surge protection devices and ground.

7. The surge protection circuit of claim 6, further comprising a second plurality of surge protection devices identical in structure to said plurality of surge protection devices, the source-drain paths of said second plurality of surge protection devices being respectively connected to the pad electrodes via respective lines for establishing a low-impedance path to ground.

8. A surge protection circuit, comprising:
a plurality of surge protection devices, each of said protection devices comprising:
an insulator;
a gate electrode embedded in said insulator;
a source electrode and a drain electrode on said insulator, said source and drain electrodes respectively forming first and second capacitances with said gate electrode; and
a semiconductor island on said insulator, said island forming a channel region between said source and drain electrodes and forming a third capacitance with said gate electrode, said third capacitance being smaller than either of said first and second capacitances, said source and drain electrodes of each of said surge protection devices being adapted to be connected in series to external circuitry for establishing a low-impedance path to ground when the external circuitry is subjected to a surge potential.

9. The surge protection circuit of claim 8, wherein said first and second capacitances of each of said surge protection devices are of equal value.

10. A surge protection circuit for a semiconductor display panel, said circuit comprising:
a first plurality of pad electrodes;
a plurality of vertical signal lines connected respectively to said first plurality of pad electrodes;
a second plurality of pad electrodes;
a plurality of horizontal signal lines intersecting said vertical signal lines, said horizontal signal lines being connected respectively to said second plurality of pad electrodes; and
a plurality of floating-gate field effect transistors, each having a channel capacitance and including a floating gate electrode, a source electrode and a drain electrode, said source and drain electrodes of each of said transistors being respectively connected to the drain and source electrodes of adjacent ones of said plurality of floating-gate transistors and further connected to respective ones of said first plurality of pad electrodes, each of said transistors being responsive to the respective pad electrode, or to the vertical signal line connected to the respective pad electrode, being subjected to a surge potential for developing a voltage on said channel capacitance sufficient to turn on said floating-gate field effect transistor and establish connections with said adjacent floating-gate transistors.

11. A surge protection circuit for a semiconductor display panel, said circuit comprising:
a first plurality of pad electrodes;
a plurality of vertical signal lines connected respectively to said first plurality of pad electrodes;
a second plurality of pad electrodes;
a plurality of horizontal signal lines intersecting said vertical signal lines, the horizontal signal lines being connected respectively to said second plurality of pad electrodes; and
a plurality of floating-gate field effect transistors, each including an insulator, a floating gate electrode, a source electrode and a drain electrode, said source and drain electrodes of each of said transistors being respectively connected to the drain and source electrodes of adjacent ones of said plurality of floating-gate transistors and further connected to respective ones of said first plurality of pad electrodes for establishing connections with said adjacent floating-gate transistors when the respective pad electrode, or the vertical signal line connected to the respective pad electrode, is subjected to a surge potential, wherein in each transistor said floating gate electrode is embedded in said insulator, said source electrode and said drain electrode are formed on said insulator so that said source and drain electrodes respectively form first and second capacitances with said floating gate electrode, and a semiconductor island is provided on said insulator to form a channel between said source and drain electrodes and to form a third capacitance with said gate electrode, said third capacitance being smaller than either of said first and second capacitances.

12. The surge protection circuit of claim 11 wherein said first and second capacitances of each of said floating-gate transistors are of equal value.

13. The surge protection circuit of claim 10, further comprising a second plurality of floating-gate transistors, said source-drain paths of said second plurality of floating-gate transistors being respectively connected to said first plurality of pad electrodes via respective lines for establishing a low-impedance path to ground.

14. The surge protection circuit of claim 10, further comprising:
   a first additional floating-gate transistor connected between a first one of said plurality of floating-gate transistors and ground; and
   a second additional floating-gate transistor connected between a second one of said plurality of floating-gate transistors and ground.

15. The surge protection circuit of claim 14, further comprising a second plurality of floating-gate transistors, the source-drain paths of said second plurality of floating-gate transistors being respectively connected to said first plurality of pad electrodes via said vertical signal lines for establishing a low-impedance path to ground.

16. A surge protection circuit for a semiconductor display panel, comprising:
   a first plurality of pad electrodes;
   a plurality of vertical signal lines connected respectively to said first plurality of pad electrodes;
   a second plurality of pad electrodes;
   a plurality of horizontal signal lines intersecting said vertical signal lines, the horizontal signal lines being connected respectively to said second plurality of pad electrodes, and
   a plurality of floating-gate field effect transistors, each having a channel capacitance and including a floating gate electrode, a source electrode and a drain electrode, said source and drain electrodes of each of said transistors being respectively connected to said vertical signal lines, each of said transistors being responsive to the respective vertical signal line, or the pad electrode connected to the respective vertical signal line, being subjected to a surge potential for developing a voltage on said channel capacitance sufficient to turn on said floating-gate field effect transistor and establish a low-impedance path to ground.

17. A surge protection circuit for a semiconductor display panel, said circuit comprising:
   a first plurality of pad electrodes;
   a plurality of vertical signal lines connected respectively to said first plurality of pad electrodes;
   a second plurality of pad electrodes;
   a plurality of horizontal signal lines intersecting said vertical signal lines, the horizontal signal lines being connected respectively to said second plurality of pad electrodes, and
   a plurality of floating-gate field effect transistors, each including an insulator, a floating gate electrode, a source electrode and a drain electrode, said source and drain electrodes of each of said transistors being respectively connected to said vertical signal lines for establishing a low-impedance path to around when the respective vertical signal line, or the pad electrode connected to the respective vertical signal line, is subjected to a surge potential,
   wherein in each transistor said floating gate electrode is embedded in said insulators, and said source electrode and said drain electrode are formed on said insulator so that said source and drain electrodes respectively form first and second capacitances with said floating gate electrode, and a semiconductor island is provided on said insulator to form a channel between said source and drain electrodes and to form a third capacitance with said gate electrode, the third capacitance being smaller than either of said first and second capacitances.

18. The surge protection circuit of claim 17, wherein said first and second capacitances of each of said floating-gate transistors are of equal value.

19. A surge protection device, comprising:
   a gate electrode;
   a source electrode forming a first capacitance with said gate electrode;
   a drain electrode forming a second capacitance with said gate electrode; and
   a channel region between said source and drain electrodes and forming a third capacitance with said gate electrode, said third capacitance being smaller than either of said first and second capacitances,
   said source and drain electrodes being adapted for connection to external circuitry for establishing a low-impedance path when the external circuitry is subjected to a surge potential.

20. A surge protection circuit, comprising:
   a plurality of surge protection devices, each of said protection devices comprising:
      a gate electrode;
      a source electrode forming a first capacitance with said gate electrode;
      a drain electrode forming a second capacitance with said gate electrode; and
      a channel region between said source and drain electrodes and forming a third capacitance with said gate electrode, said third capacitance being smaller than either of said first and second capacitances,
   said source and drain electrodes of each of said surge protection devices being respectively connected to the drain and source electrodes of adjacent ones of said plurality of surge protection devices and adapted to be connected to pad electrodes of external circuitry for establishing connections with said adjacent surge protection devices when one of the pad electrodes is subjected to a surge potential.

21. A surge protection circuit, comprising:
   a plurality of surge protection devices, each of said protection devices comprising:
      a gate electrode;
      a source electrode forming a first capacitance with said gate electrode;
      a drain electrode forming a second capacitance with said gate electrode; and
      a semiconductor island forming a channel region between said source and drain electrodes and forming a third capacitance with said gate electrode, said third capacitance being smaller than either of said first and second capacitances, said source and drain electrodes of each of said surge protection devices being adapted to be connected in series to external circuitry for establishing a low-impedance path to ground when the external circuitry is subjected to a surge potential.

22. A surge protection circuit for a semiconductor display panel, said circuit comprising:

a plurality of vertical signal lines;

a plurality of horizontal signal lines intersecting said vertical signal lines; and a plurality of floating-gate field effect transistors, each having a channel capacitance and including a floating gate electrode, a source electrode and a drain electrode, said source and drain electrodes of each of said transistors being respectively connected to the drain and source electrodes of adjacent ones of said plurality of floating-gate transistors and adapted to be connected to respective pad electrodes so as to be responsive to the respective pad electrode being subjected to a surge potential for developing a voltage on said channel capacitance sufficient to turn on said floating-gate field effect transistor and establish connections with said adjacent floating-gate transistors.

23. A surge protection circuit for a semiconductor display panel, comprising:

a plurality of vertical signal lines;

a plurality of horizontal signal lines intersecting said vertical signal lines; and a plurality of floating-gate field effect transistors, each having a channel capacitance and including a floating gate electrode, a source electrode and a drain electrode, said source and drain electrodes of each of said transistors being respectively connected to said vertical signal lines, each of said transistors being responsive to the respective vertical signal line being subjected to a surge potential for developing a voltage on said channel capacitance sufficient to turn on said floating-gate field effect transistor and establish a low-impedance path to ground.

* * * * *